United States Patent
Park et al.

(10) Patent No.: US 9,995,205 B2
(45) Date of Patent: Jun. 12, 2018

(54) CONDENSED WATER DISCHARGE APPARATUS

(71) Applicant: Hyundai Motor Company, Seoul (KR)

(72) Inventors: Jeon Jin Park, Suwon-si (KR); Kyoung Ik Jang, Yongin-si (KR); Sung Soo Kim, Gimpo-si (KR); Joon Myung Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 113 days.

(21) Appl. No.: 14/951,403

(22) Filed: Nov. 24, 2015

(65) Prior Publication Data

US 2017/0074156 A1 Mar. 16, 2017

(30) Foreign Application Priority Data

Sep. 14, 2015 (KR) .......................... 10-2015-0129688

(51) Int. Cl.
*F02B 29/04* (2006.01)
*F02M 35/104* (2006.01)

(52) U.S. Cl.
CPC ...... *F02B 29/0468* (2013.01); *F02B 29/0475* (2013.01); *F02M 35/104* (2013.01); *Y02T 10/146* (2013.01)

(58) Field of Classification Search
CPC .. F02B 29/0468; F02B 29/04; F02B 29/0406; F02B 29/0475; F02M 35/10268; F02M 26/30
See application file for complete search history.

(56) References Cited

U.S. PATENT DOCUMENTS

| 7,251,937 B2* | 8/2007 | Appleton ............ F02B 29/0406 123/563 |
| 8,191,366 B2* | 6/2012 | Taylor ................. F02B 29/0468 123/542 |
| 8,371,119 B2* | 2/2013 | Durand .................... F01M 1/00 123/563 |
| 8,459,224 B2* | 6/2013 | Harada .................. F02M 29/00 123/184.47 |

(Continued)

FOREIGN PATENT DOCUMENTS

| JP | 2000-130172 A | 5/2000 |
| JP | 2002-349273 A | 12/2002 |

(Continued)

OTHER PUBLICATIONS

Office Action dated Feb. 21, 2017 in corresponding Korean Patent Application No. 10-2015-0129688.

*Primary Examiner* — Long T Tran
(74) *Attorney, Agent, or Firm* — McDermott Will & Emery LLP

(57) ABSTRACT

A condensed water discharge apparatus in an engine of a vehicle provided with a water cooling type intercooler installed integrally with an intake manifold includes a body provided on the intake manifold and having a designated receipt space formed therein to store condensed water generated by the intercooler and a discharge hole formed in the receipt space to discharge the condensed water stored in the receipt space to the outside through the discharge hole; a discharge valve configured to open and close the discharge hole; and an operating unit connected to the discharge valve to operate the discharge valve.

8 Claims, 5 Drawing Sheets

(56) References Cited

U.S. PATENT DOCUMENTS

| | | | | |
|---|---|---|---|---|
| 2009/0173678 A1* | 7/2009 | Lysne | ................... | C01D 3/00 210/170.11 |
| 2012/0055151 A1* | 3/2012 | Durand | ................... | F01M 1/00 60/599 |
| 2014/0041381 A1* | 2/2014 | Kuske | ................... | F02B 37/00 60/602 |
| 2015/0167539 A1* | 6/2015 | Basile | ................ | F02B 29/0468 60/599 |
| 2015/0176478 A1* | 6/2015 | Wicks | ................ | F02B 29/0468 60/599 |

FOREIGN PATENT DOCUMENTS

| | | |
|---|---|---|
| JP | 2012-087718 A | 5/2012 |
| JP | 2013-249761 A | 12/2013 |
| JP | 2014-169654 A | 9/2014 |
| KR | 10-1998-0056747 A | 9/1998 |
| KR | 10-0428221 B1 | 4/2004 |
| KR | 10-2011-0062184 A | 6/2011 |
| KR | 10-2015-0075421 A | 7/2015 |

\* cited by examiner

CONDENSED WATER DISCHARGE APPARATUS

CROSS-REFERENCE TO RELATED APPLICATION

This application claims the benefit of priority to Korean Patent Application No. 10-2015-0129688, filed on Sep. 14, 2015 in the Korean Intellectual Property Office, the entirety of which is incorporated herein by reference.

TECHNICAL FIELD

The present disclosure relates to a condensed water discharge apparatus which prevents condensed water generated by a water cooling type intercooler from being introduced into a combustion chamber of an engine provided with the water cooling type intercooler installed integrally with an intake manifold.

BACKGROUND

In a vehicle provided with a turbocharger, and particularly in the case of an engine in which a water cooling type intercooler is installed integrally with an intake manifold to cool air supercharged by a turbocharger, condensed water is formed on the surface of a fin of the intercooler due to a temperature difference between air before the intercooler and air after the intercooler. If such condensed water is introduced into a combustion chamber of the engine along an intake line, the condensed water is diluted with engine oil within the combustion chamber, boiled to a high temperature within the oil and then vaporized, and vapor is included within the oil, and circulated together with the oil and thus influences respective parts of the engine.

In this case, parts of the engine may be damaged or engine performance may be lowered, fuel efficiency may be deteriorated, noise, vibration and harshness (NVH) may be increased and, thus, durability and reliability of the engine may be lowered.

The above description has been provided to aid in understanding of the background of the present disclosure and should not be interpreted as conventional technology known to those skilled in the art.

SUMMARY

Therefore, the present disclosure has been made in view of the above problems, and it is an object of the present disclosure to provide a condensed water discharge apparatus which prevents condensed water generated by a water cooling type intercooler from being introduced into a combustion chamber of an engine provided with the water cooling type intercooler installed integrally with an intake manifold.

In accordance with the present disclosure, the above and other objects can be accomplished by the provision of a condensed water discharge apparatus in an engine of a vehicle provided with a water cooling type intercooler installed integrally with an intake manifold, the condensed water discharge apparatus, the condensed water discharge apparatus including a body provided on the intake manifold and having a designated receipt space formed therein to store condensed water generated by the intercooler and a discharge hole formed in the receipt space to discharge the condensed water stored in the receipt space to the outside through the discharge hole, a discharge valve configured to open and close the discharge hole, and an operating unit connected to the discharge valve to operate the discharge valve.

The body may be inclined such that the inclination angle thereof is gradually increased in the backward direction of the vehicle and, thus, when the discharge valve is opened, the condensed water stored in the receipt space may be discharged to the outside by gravity.

The body may be inclined such that the inclination angle thereof is gradually decreased in the backward direction of the vehicle and, thus, when the discharge valve is opened, the condensed water stored in the receipt space may be discharged to the outside by gravity.

The body may be inclined in the forward and backward directions and the leftward and rightward directions of the vehicle and the discharge hole is formed on the lowermost surface of the inclined body.

One side of the operating unit may be connected to the discharge valve and the other side of the operating unit may be connected to an intake line of the engine such that the operating unit may be operated using air pressure formed in the intake line and the discharge valve may be opened and closed.

The operating unit may be connected to the discharge valve by a rotational link using a pin such that the discharge valve may be operated when the rotational link is rotated about the pin by operation of the operating unit.

The operating unit may include a pressure part and an operating link operated by the pressure part, the pressure part may be connected to an intake line of the engine, the operating link may be connected to the discharge valve such that the discharge valve is operated when a change in the pressure of the intake line operates the pressure part and the pressure part then operates the operating link.

One side of the operating unit may be connected to the discharge valve and the other side of the operating unit may be connected to an intake line of the engine such that the discharge valve may maintain the closed state by pressure formed in the intake line when the engine of the vehicle is turned on.

One side of the operating unit may be connected to the discharge valve and the other side of the operating unit may be connected to an intake line of the engine such that pressure formed in the intake line may be released and the discharge valve may be opened to discharge condensed water to the outside when the engine of the vehicle is turned off.

The body may communicate with the intake manifold.

BRIEF DESCRIPTION OF THE DRAWINGS

The above and other objects, features and other advantages of the present inventive concept will be more clearly understood from the following detailed description taken in conjunction with the accompanying drawings, in which.

DETAILED DESCRIPTION OF THE PREFERRED EMBODIMENTS

Reference will now be made in detail to the embodiments in the disclosure, examples of which are illustrated in the accompanying drawings. Wherever possible, the same reference numbers will be used throughout the drawings to refer to the same or like parts.

Hereinafter, a condensed water discharge apparatus in accordance with one embodiment in the disclosure will be described with reference to the accompanying drawings.

Figure 1:
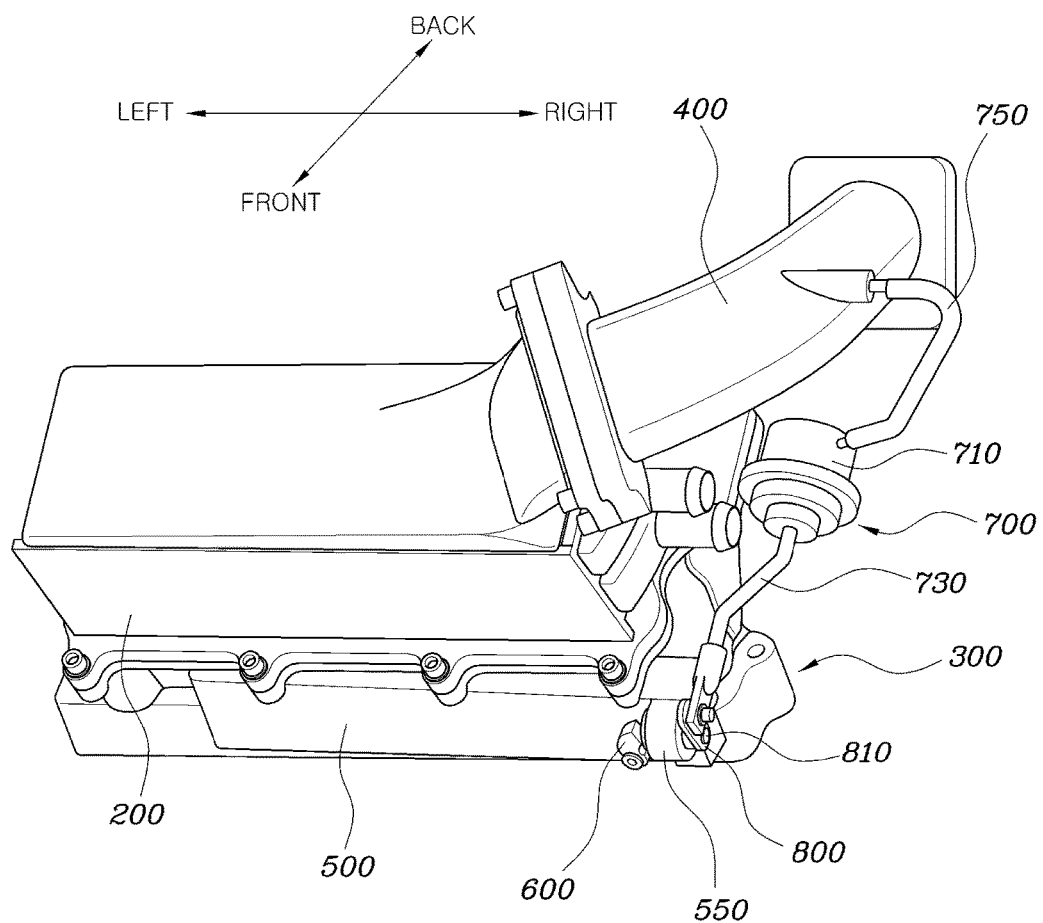
FIG. 1 is a perspective view illustrating a condensed water discharge apparatus in accordance with one embodiment in the disclosure.
Figure 2:
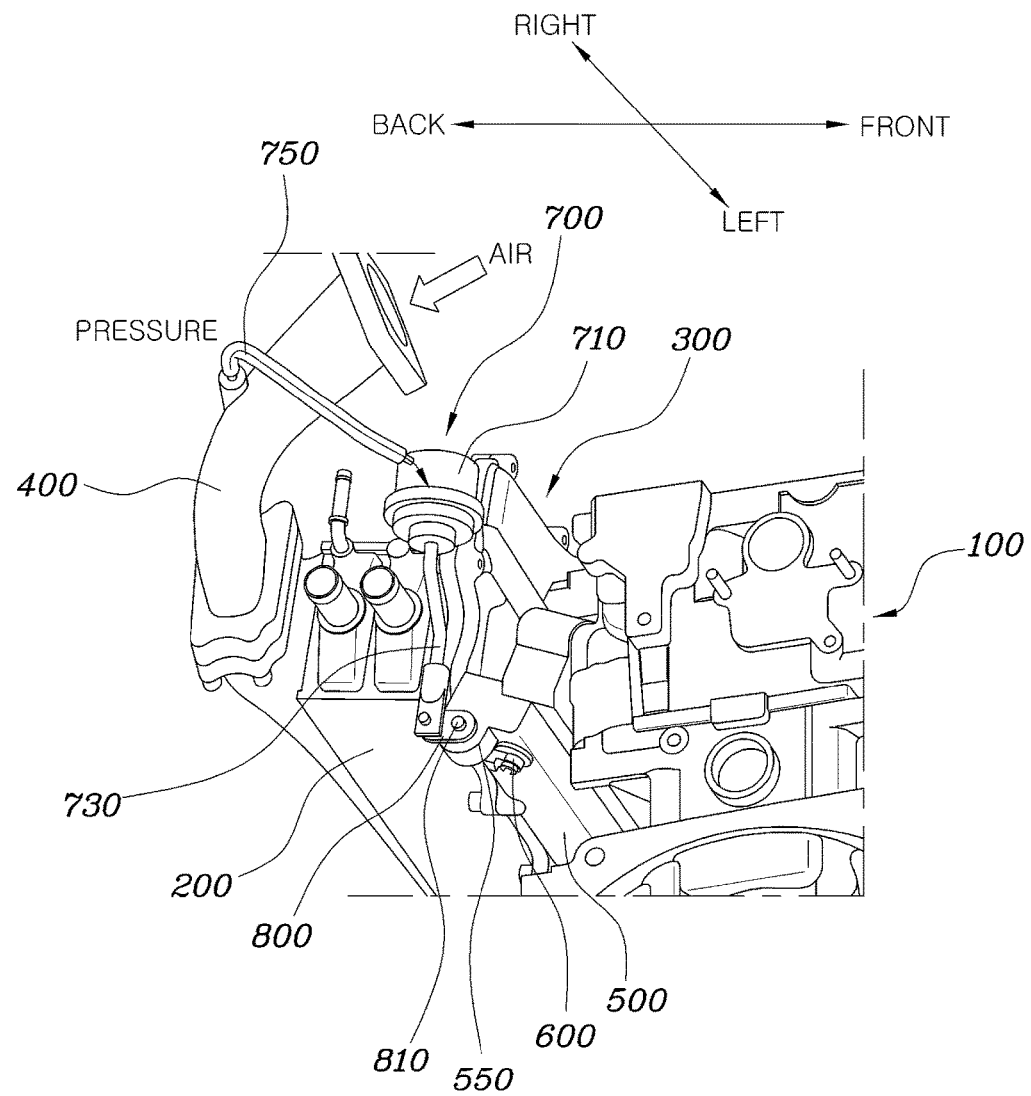
FIG. 2 is a view illustrating an operating unit of FIG. 1 during operation.
Figure 3:
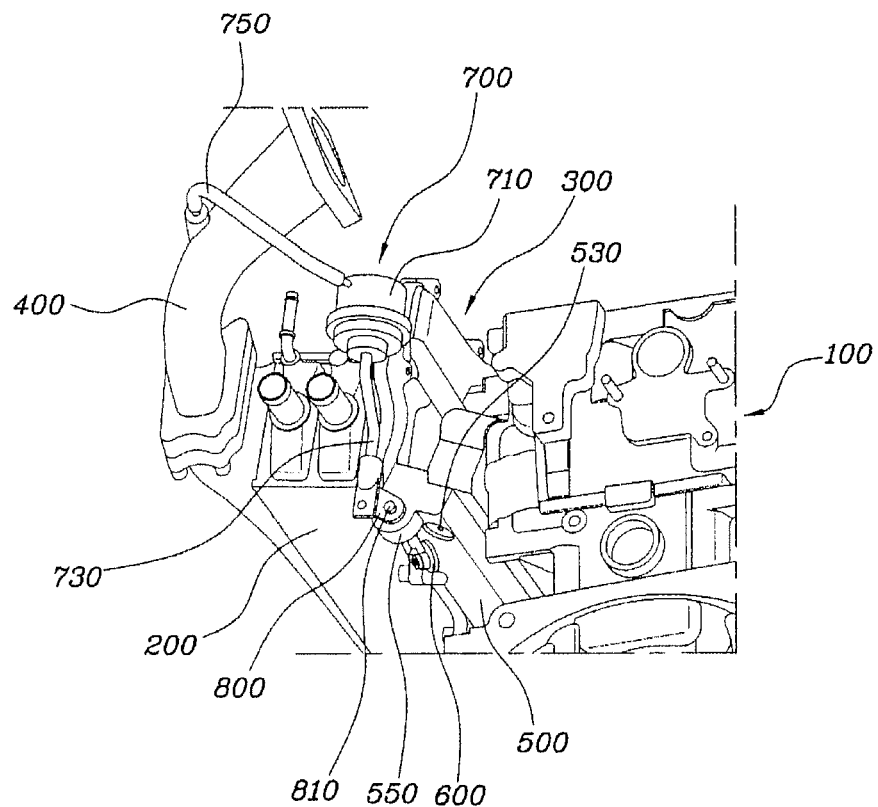
FIG. 3 is a view illustrating the operating unit of FIG. 1 during release of operation.
Figure 4:
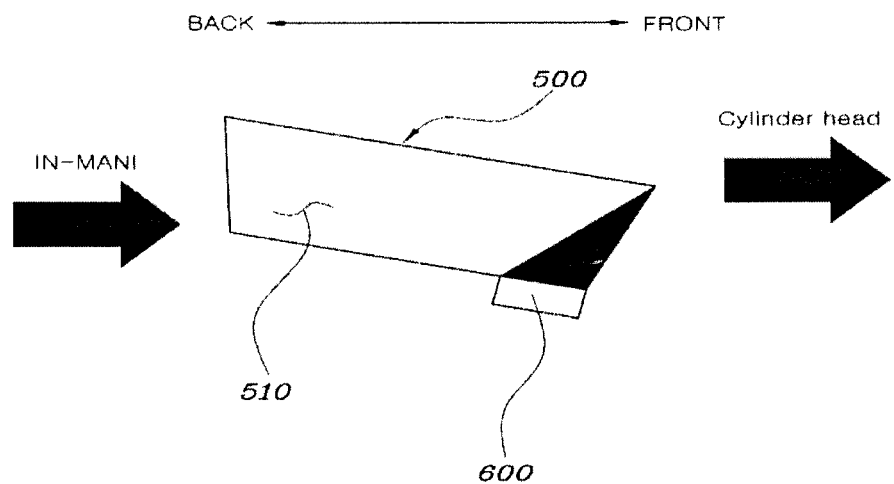
FIGS. 4 and 5 are views illustrating operation of a discharge valve in accordance with one embodiment in the disclosure.
Figure 5:
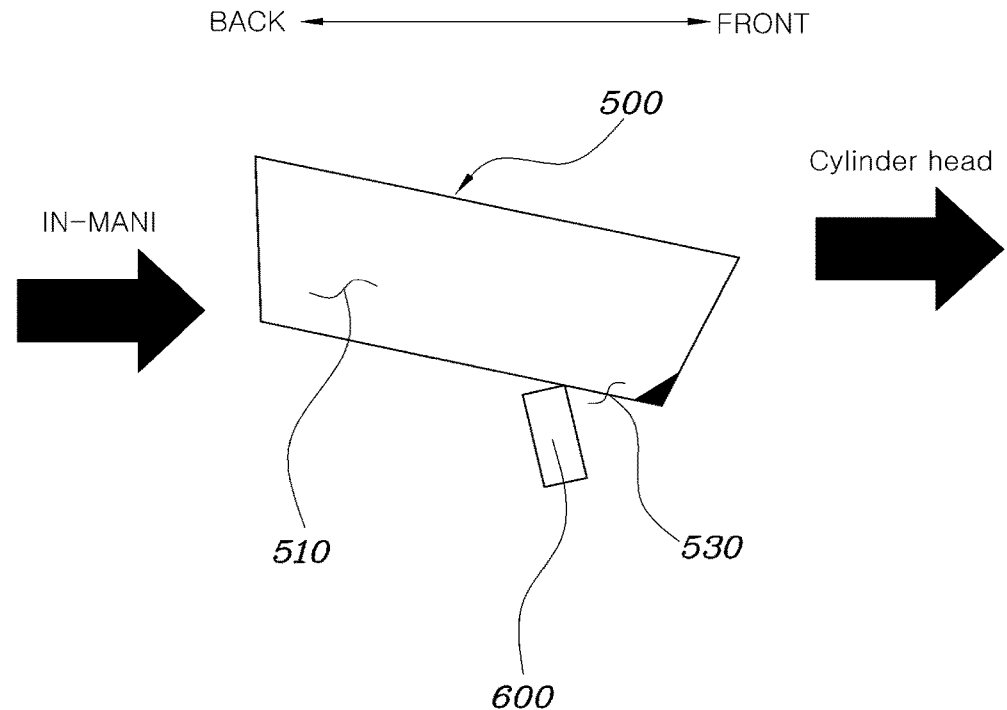

FIG. 1 is a perspective view illustrating a condensed water discharge apparatus in accordance with one embodiment in the disclosure. FIG. 2 is a view illustrating an operating unit 700 of FIG. 1 during operation, and FIG. 3 is a view illustrating the operating unit 700 of FIG. 1 during release of operation. Further, FIGS. 4 and 5 are views illustrating operation of a discharge valve 600 in accordance with one embodiment in the disclosure.

The condensed water discharge apparatus in accordance with one embodiment in the disclosure, in an engine 100 in which a water cooling type intercooler 200 is installed integrally with an intake manifold 300, includes a body 500 provided on the intake manifold 300 and having a designated receipt space 510 formed therein to store condensed water generated by the intercooler 200 and a discharge hole 530 formed in the receipt space 510 to discharge the condensed water stored in the receipt space 510 to the outside through the discharge hole 530. A discharge valve 600 is provided to open and close the discharge hole 530, and an operating unit 700 connected to the discharge valve 600 is provided to operate the discharge valve 600. Further, the body 500 may communicate with the intake manifold 300 so that the inside of the body 500 may maintain the same pressure as that of the intake side of the intake manifold 300 when the engine 100 is turned on.

The body 500 may be provided at the lower part of the intake manifold 300 or the side surface of the intake manifold 300. Although FIG. 1 illustrates the body 500 as being provided at the lower part of the intake manifold 300, the position of the body 500 may be variously modified by those skilled in the art. The designated receipt space 510 is formed within the body 500 and the discharge hole 530 is formed in the receipt space 510. Therefore, condensed water generated by the intercooler 200 may be stored in the receipt space 510 and discharged to the outside through the discharge hole 530.

The body 500 may be inclined such that the inclination angle thereof is gradually increased in the backward direction of the vehicle. Alternatively, the body 500 may be inclined such that the inclination angle thereof is gradually decreased in the backward direction of the vehicle, or inclined such that the inclined height thereof is gradually decreased or increased, thus discharging condensed water stored in the receipt space 510 to the outside by gravity when the discharge valve 600 is opened. In particular, the body 500 may be inclined in the forward and backward directions and the leftward and backward directions of the vehicle such that the discharge hole 530 is formed on the lowermost surface of the inclined body 500.

Further, the discharge valve 600 is provided at the discharge hole 530, thus opening and closing the discharge hole 530. The discharge valve 600 is connected to the operating unit 700 and is operated when the operating unit 700 is operated. Therefore, the discharge hole 530 is not opened at all times but may be opened and closed, as needed. Therefore, during driving of the engine 100, condensed water is stored in the receipt space 510 of the body 500 so as not to disturb driving of the engine 100. After driving of the engine 100 has ended, the condensed water stored in the receipt space 510 is discharged to the outside by opening the discharge valve 600.

One side of the operating unit 700 is connected to the discharge valve 600 and the other side of the operating unit 700 is connected to an intake line 400 of the engine 100. Therefore, the operating unit 700 is operated using air pressure formed in the intake line 400 and, thus, the discharge valve 600 may be opened and closed without a separate power unit or control unit.

In more detail, the discharge valve 600 is connected to the body 500 so as to be rotatable about a connection boss 550 and the operating unit 700 is connected to the discharge valve 600 by a rotational link 800 using a pin 810. The operating unit 700 is connected to the intake line 400 by an air pipe 750 and may thus be operated using air pressure formed in the intake line 400. Therefore, when the operating unit 700 is operated by the pressure of the intake line 400, the rotational link 800 is rotated about the pin 810 and the discharge valve 600 is operated so as to open or close the discharge hole 530.

The operating unit 700 may include a pressure part 710 and an operating link 730 operated by the pressure part 710. The pressure part 710 is connected to the intake line 400 by the air pipe 750 and the operating link 730 is connected to the discharge valve 600 connected to the connection boss 550 of the body 500 by the rotational link 800. Therefore, when the pressure part 710 is operated by a change of the pressure of the intake line 400 and then operates the operating link 730, the discharge valve 600 is operated to open or close the discharge hole 530 and condensed water is stored in the receipt space 510 of the body 500 or the condensed water stored in the receipt space 510 is discharged to the outside.

In more detail, FIG. 2 is a view illustrating the operating unit 700 during operation and, when the engine 100 of the vehicle is turned on, air flows sequentially along the intake line 400, the intercooler 200 and the intake manifold 300. Therefore, constant pressure is formed at the intake side.

One side of the operating unit 700 is connected to the discharge valve 600 and the other side of the operating unit 700 is connected to the intake line 400. Therefore, when the engine 100 of the vehicle is turned on, the pressure part 710 maintains a state of pulling the operating link 730 by constant pressure formed in the intake line 400 and the discharge valve 600 maintains the closed state, thus allowing condensed water to be stored in the receipt space 510 of the body 500.

FIG. 3 is a view illustrating the operating unit 700 during release of operation and, when the engine 100 of the vehicle is turned off, air flow is cut off and constant pressure formed at the intake side is released. Therefore, the pressure part 710 pushes the operating link 730 and the rotational link 800 is rotated about the pin 810 by the force of the pushing of the operating link 730. Thereby, the discharge valve 600 is operated to open the discharge hole 530, and the condensed water stored in the receipt space 510 of the body 500 is discharged to the outside through the discharge hole 530. Therefore, introduction of condensed water generated by the intercooler 200 into the combustion chamber of the engine 100 is prevented.

Figure 6:
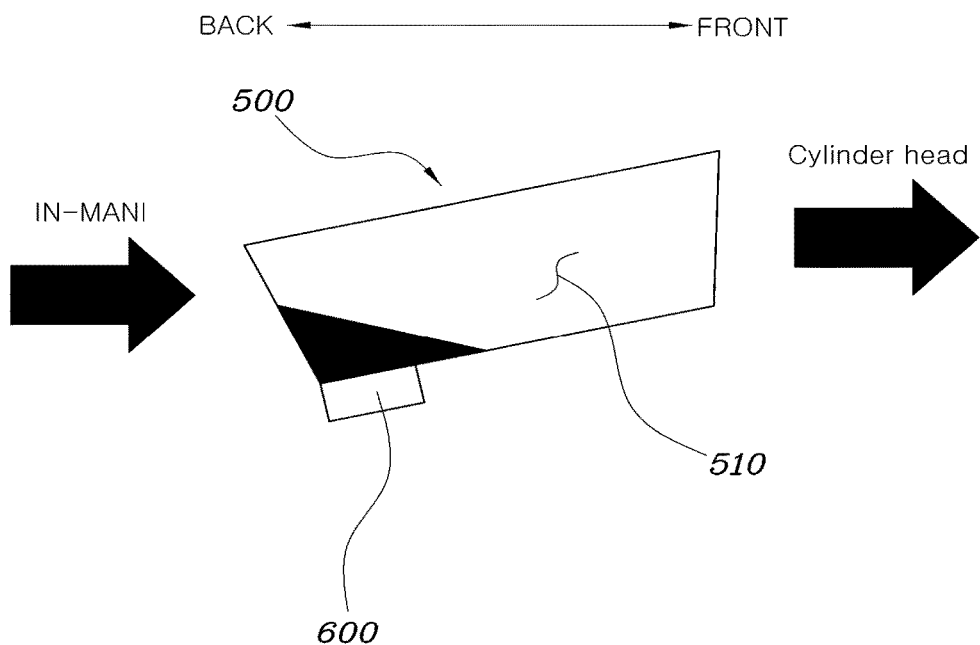
FIGS. 6 and 7 are views illustrating operation of a discharge valve in accordance with another embodiment in the disclosure.
Figure 7:
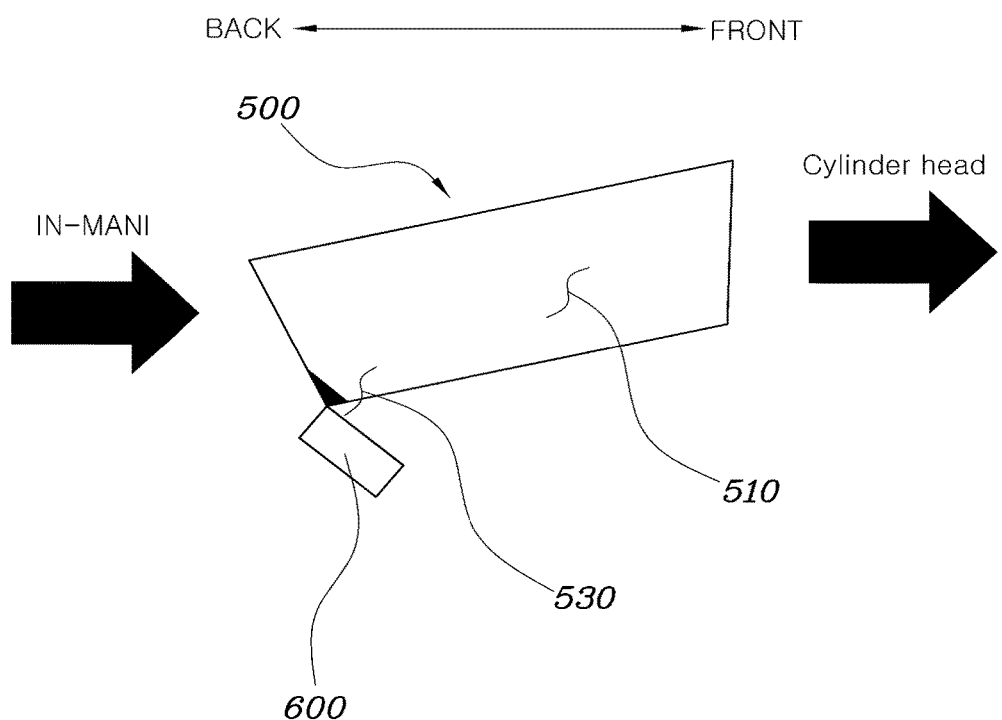

FIGS. 4 and 5 are views illustrating operation of a discharge valve 600 in accordance with one embodiment in the disclosure, i.e., illustrating storage and discharge of condensed water in the receipt space 510 along the inclined surface of the body 500. Further, FIGS. 6 and 7 are views illustrating operation of a discharge valve 600 in accordance with another embodiment in the disclosure, i.e., illustrating storage and discharge of condensed water in the receipt space 510 along the inclined surface of the body 500. The positions and shapes of the body 500, the discharge hole 530 and the discharge valve 600 are not limited to the above two embodiments and may be variously changed according to designs and environments.

As is apparent from the above description, a condensed water discharge apparatus in accordance with the present inventive concept prevents condensed water generated by a water cooling type intercooler from being introduced into a combustion chamber of an engine provided with the water cooling type intercooler installed integrally with an intake manifold. This improves performance, durability and reliability of the engine, enhancing fuel efficiency and lowering noise, vibration and harshness (NVH). Furthermore, the condensed water discharge apparatus in accordance with the present inventive concept may prevent damage to parts within a combustion chamber caused by introduction of moisture into the combustion chamber, into which only fuel and air need to be introduced.

Although the preferred embodiments in the disclosure have been disclosed for illustrative purposes, those skilled in the art will appreciate that various modifications, additions and substitutions are possible, without departing from the scope and spirit of the inventive concept as disclosed in the accompanying claims.

What is claimed is:

1. A condensed water discharge apparatus in an engine of a vehicle provided with a water cooling type intercooler installed integrally with an intake manifold, the condensed water discharge apparatus including:
    a body provided on the intake manifold and having a designated receipt space formed therein to store condensed water generated by the intercooler and a discharge hole formed in the receipt space to discharge the condensed water stored in the receipt space to the outside through the discharge hole;
    a discharge valve configured to open and close the discharge hole;
    an operating unit connected to the discharge valve to operate the discharge valve,
    wherein one side of the operating unit is connected to the discharge valve and the other side of the operating unit is connected to an intake line of the engine such that the discharge valve is opened and closed when the operating unit is operated using air pressure formed in the intake line, and
    wherein the operating unit includes a pressure part and an operating link operated by the pressure part, the pressure part is connected to an intake line of the engine, and the operating link is connected to the discharge valve such that the discharge valve is operated when a change in the pressure of the intake line operates the pressure part and the pressure part then operates the operating link.

2. The condensed water discharge apparatus according to claim 1, wherein the body is inclined such that an inclination angle thereof is gradually increased in the backward direction of the vehicle such that the condensed water stored in the receipt space is discharged to the outside by gravity when the discharge valve is opened.

3. The condensed water discharge apparatus according to claim 1, wherein the body is inclined such that an inclination angle thereof is gradually decreased in the backward direction of the vehicle such that the condensed water stored in the receipt space is discharged to the outside by gravity when the discharge valve is opened.

4. The condensed water discharge apparatus according to claim 1, wherein the body is inclined in the forward and backward directions and the leftward and rightward directions of the vehicle, and the discharge hole is formed on the lowermost surface of the inclined body.

5. The condensed water discharge apparatus according to claim 1, wherein the operating unit is connected to the discharge valve by a rotational link using a pin such that the discharge valve is operated when the rotational link is rotated about the pin by operation of the operating unit.

6. The condensed water discharge apparatus according to claim 1, wherein one side of the operating unit is connected to the discharge valve and the other side of the operating unit is connected to an intake line of the engine such that the discharge valve maintains the closed state by pressure formed in the intake line when the engine of the vehicle is turned on.

7. The condensed water discharge apparatus according to claim 1, wherein one side of the operating unit is connected to the discharge valve and the other side of the operating unit is connected to an intake line of the engine such that pressure formed in the intake line is released and the discharge valve is opened to discharge condensed water to the outside when the engine of the vehicle is turned off.

8. The condensed water discharge apparatus according to claim 1, wherein the body communicates with the intake manifold.

* * * * *